3,275,406
CONVERSION OF SO₂ TO SO₃ WITH A CATALYST OF SELECTED POROSITY

Robert Krempff, Paris, France, assignor to Compagnie de Saint-Gobain, Neuilly-sur-Seine, Seine, France
No Drawing. Original application Aug. 16, 1962, Ser. No. 217,288, now Patent No. 3,216,953, dated Nov. 9, 1965. Divided and this application Nov. 5, 1964, Ser. No. 409,298
6 Claims. (Cl. 23—175)

This is a division of application Serial No. 217,288, filed August 16, 1962, now Patent No. 3,216,953.

This invention relates to the manufacture of $SO_3$ by the catalytic oxidation of $SO_2$ on vanadium-potassium-silica catalysts. The invention also relates to the manufacture of novel catalysts for this process. The invention also includes a novel method for producing the new catalysts. This invention relates to the preparation of sulfur trioxide from sulfur dioxide and more particularly to the manufacture of sulfur trioxide using catalytic granules of varying porosity.

In the manufacture of $SO_3$ by the catalytic oxidation of $SO_2$ it is customary to mount the active catalyst which is composed of vanadium oxide and potassium oxide, on a silica support. During the preparation of the granules of the catalyst an effort is made to produce the largest catalytic surface possible. At the same time, it is known that when one is dealing with catalytic activity the whole answer to the problem is not found in mere surface area. It is known that in gaseous catalytic reactions, such as the one involved in this invention, the kinetic and diffusional coefficients of the gas must also be considered as well as the geometric conformation of the granules.

In the catalytic production of $SO_3$ the process proceeds first at high temperature, usually between 440 and 550° C., and then the temperature of the reaction falls as the reaction proceeds until it finally is below 400° C. It is also known by this inventor that the efficiency of these catalysts is not the same at different temperatures. For instance, the catalytic oxidation of $SO_2$ to $SO_3$ goes to substantial completion only at relatively low temperature, which constitutes an imperfection in the process because of relatively low rate of reaction at such temperatures. For example, when a gas containing 7% of $SO_2$, 11% of $O_2$, and 82% of $N_2$ is sent into contact with a vanadium-silica catalyst the conversion at 440° C. is only 98%, whereas at 400° C. the conversion reaches the rate of 99.2%.

It is an object of this invention to provide a process for converting sulfur dioxide to sulfur trioxide using a plurality of granules having selective porosity so that granules of high efficiency will be used at high temperatures and other granules of high efficiency will be used at lower temperatures.

It is an object of this invention to produce a catalyst which will have high efficiency at high temperature and other catalysts which will have high efficiency at lower temperature and by the selective use of these novel catalysts to improve the overall efficiency of the catalytic conversion. It is another object to provide a sulfur dioxide to sulfur trioxide process having a train of selective granules of varying porosity but all of high efficiency.

These objects of the invention have been accomplished by a method of oxidizing $SO_2$ gas to $SO_3$ gas on a vanadium, potassium, silica catalyst which comprises commencing the reaction on a said catalyst having a majority of pores above about 3000 A. radius at a temperature between about 440 and 550° C., and at a temperature below 440° continuing the reaction on a similar catalyst having a majority of pores of materially smaller radius. According to this invention granules of larger pore size are used at the high reaction temperatures and granules of smaller pore size are used at the lower reaction temperature.

The novel catalysts which are used in the novel process are a porous silica-vanadium oxide-potassium oxide catalyst having at least a 60% of pores of radius in the range of about 1000 and 3000 A., and a porous silica-vanadium oxide-potassium oxide catalyst having at least 60% of pores of radius in the range between about 50 and 500 A. The granules of this invention can produce at high speeds of reaction even at temperatures below 400° C. when the temperature of the said conversion reaction falls to this temperature range.

The novel method of preparing a catalyst comprises depositing vanadium oxide and potassium oxide on finely divided silica, drying the mass, crumbling the mass and screening it, compressing the graded particles, thereby producing granules of about 6 mm. diameter, and calcining and cooling the mass.

In order to prepare the novel catalyst for use in the novel process it was necessary to invent a method of preparing the catalysts by which pores sizes could be controlled and this will be described in detail hereinafter.

By virtue of these new catalysts we can produce high speeds of reaction at temperatures below 400° C. and these can be used during the later stages of the catalytic oxidation when the temperature of the reaction mixture has been appreciably reduced. On the other hand, at the beginning of the catalytic oxidation we have provided catalysts having excellent activity in the temperature zone between 400 and 550° C. Thus, by beginning the catalytic oxidation on the catalyst of high efficiency at high temperature and thereafter continuing the reaction on the catalyst of high efficiency at the lower temperature a material improvement in the overall efficiency of the process is obtained.

I have established that the efficiency of the catalyst is a function of the radius of the pores of the catalyst and that the process proceeds best at high temperature with catalysts having larger pores and at low temperature with catalysts having pores of smaller radius.

The catalysts employed consist essentially of $K_2O$ which is present in 3 to 20% of the weight of the catalyst, and preferably from 9 to 11%, $V_2O_5$ which is present from 3 to 15%, and preferably from 7 to 9%, the balance to make about 100% being $SiO_2$. I have shown that these catalysts, when used at temperatures not substantially higher than 400° C. for the oxidation of $SO_2$ to $SO_3$, should have the highest possible content of pores having a radius between 50 and 500 A., that those used between 400 and 440°, approximately, should have the highest possible content of pores of the radius of 1000 to 3000 A., and that those used at temperatures above about 440° C. should have as high a content as possible of pores on the order of 5000 A. radius.

There are a number of procedural steps that one may adopt to produce pores of the desired size. One of these is the choice of the granulometry of the support. If one seeks to produce catalysts having pores of 50 to 500 A. radius one may use powdered silica of which the individual particles have diameters on the order of some tens to some hundreds of A.

To produce pores having a radius of about 1000 to 3000 A. one may use a powdery silica prepared by the precipitation from a silicate. For instance by the method of French Patent No. 1,001,884, or a silica as is prepared in French Patents No. 795,594 and No. 836,782. It is equally possible to use a natural silica which has been micronized.

In forming the catalyst one may satisfactorily deposit the catalytic metal oxides on the silica, dry the catalyst, and break it up in particles of convenient size, for instance sizes capable of passing a number 31 Afnor screen. The product is then agglomerated under the pressure stated above into granules of about 6 mm. diameter and calcined.

In producing the pores of selected size one may also use the temperature of calcination with effect to produce a catalyst having a silica support of 50 to 500 A. A calcination carried out at 400 to 500° C. tends to produce fine porosity with radii inferior to about 500 A. When the temperature of calcination is carried to 700 to 800° C. the pores will have radii on the order of 2000 to 3000 A.

Another element which influences the porosity is the addition to the support, during the deposition of the active catalyst of a micronized combustible or volatile product such as micronized sulfur or micronized carbon black. When these products vaporize during the calcination pores corresponding to the size of the particles are established in the silica support.

Yet another element which acts upon the porosity is the simultaneous use of silicas of different granular size. By mixing silica in particles of a new 1000 A. in diameter with a minor percentage of silica in particles of several hundreds of A. the fineness of the pores formed between the particles in the catalytic mass is increased.

The following examples are for the purpose of illustration and do not constitute a limitation on the generality of what is elsewhere herein stated and claimed.

*Example 1*

A solution is prepared containing 185 grams of potassium hydroxide, containing 28% $K_2O$ and 49 grams of 85% commercial $V_2O_5$. This mixture is treated with 215 grams of 16° sulfuric acid with vigorous agitation. 19 grams of $NH_4OH$ are added and the mixture thus obtained is slowly poured on 400 grams of finely divided silica (in this case levilite) in a mixer. The mixture of finely divided components is continued and a small amount of water may be added. After about a half hour a paste is removed from the mixer, dried at not above 100° C. and fragmented to pass a 31 Afnor screen. The produce is agglomerated by compression at 1000 kg./cm.$^2$ in granules of 6 mm. in diameter and is calcined at 600° C. The catalytic granules thus prepared have a total porosity of 1 cm.$^3$/g., of which 80% are due to pores having a radius between 1000 and 3000 A.

The addition of 10% by weight of sulfur to the silica may be adopted to improve the porosity if desired.

The catalyst thus prepared may be subjected to catalytic tests for the transformation of $SO_2$ to $SO_3$. In one of these tests a gas containing 7% $SO_2$, 11% $O_2$, and 82% $N_2$ was passed into contact with the catalyst at a space velocity of 1900 h.$^{-1}$, under isothermal conditions, producing the following rates of conversion: 18.5% at 390° C., 28% at 400° C., and 56% at 425° C.

*Example 2*

A mixture like that of Example 1 was prepared and poured slowly upon 400 grams of powdered silica having grain dimensions on the order of 150 A. The mixture is mixed and the product dried, broken up, agglomerated under pressure, as aforesaid, and calcined at about 600° C. The catalysts have a total porosity of .65 cm.$^3$/g., of which 80% is due to pores of a radius between 50 and 500 A.

When used to catalyze the same gases of Example 1 the rate of conversion was 22% at 390° C., 30.5% at 400° C., and 50% at 420° C.

In another test the calcination temperature was 750° C. and the catalyst produced had a conversion rate of 15.5% at 390° C., 54.5% at 420° C. 80% of the porosity was due to pores of a radius between 1000 and 3000 A.

*Example 3*

Natural kieselguhr, finely divided, was mixed with 10% of carbon black of particle size on the order of 100 A. and the mixture was subjected to the treatments specified in Example 1, except that the granules were agglomerated at 2000 kg./cm.$^2$ and calcined at 500° C. The catalytic mass had a total porosity of .45 cm.$^3$/g. of which 55% were due to pores having a radius between 1000 and 3000 A. During the catalytic operation recited in Example 1 rates of conversion of these catalysts were 13% at 390° C., 23% at 400° C., and 54% at 430° C.

*Example 4*

Example 2 was carried out identically with the exception that silica gel suitably prepared was used in place of the other form of silica. The results under tests proved to be equally satisfactory.

The carbon black is preferred, particularly for use with kieselguhr, which does not have the same porosity as levilite or powdered silica.

*Example 5*

A solution is prepared containing 185 grams of potassium hydroxide, containing 28% $K_2O$ and 49 grams of 85% commercial $V_2O_5$. This mixture is treated with 215 grams of 16° sulfuric acid with vigorous agitation. 19 grams of $NH_4OH$ are added and the mixture thus obtained is slowly poured on 400 grams of finely divided kieselguhr in a mixer as in Example 1. The finely divided product is agglomerated by extrusion in granules of 6 mm. in diameter and is calcined at 600° C. The catalytic granules thus prepared have a total porosity of 1 cm.$^3$/g., of which 70% are due to pores having a radius between 3000 and 5000 A.

The catalyst thus prepared may be subjected to catalytic tests for the transformation of $SO_2$ to $SO_3$. In one of these tests a gas containing 7% $SO_2$, 11% $O_2$, and 82% $N_2$ was passed into contact with the catalyst at a space velocity of 1900 h.$^{-1}$, under isothermal conditions, producing the following rates of conversion: 11.2% at 390° C., 22.6% at 400° C., and 58% at 460° C.

The advantages of the invention include the preparation of superior silica-vanadium-potassium catalysts, the improvement of the process of catalytically oxidizing $SO_2$ and a process for producing silica-base catalyst having a major proportion of pores of a selected size.

By comparing the small-pore catalyst of Example 2 with the large-pore catalyst of Example 2 it will be found that the conversion rate of the former is better than the conversion rate of the latter at low temperature, which fits the small-pore catalyst for use in the last stages of the process. On the other hand, the large-pore catalyst gives a better conversion at high temperature than the small-pore catalyst and is better adapted for use in the early high temperature phase of the reaction.

As many apparently widely different embodiments of the present invention may be made without departing from the spirit and scope thereof, it is to be understood that the invention is not limited to the specific embodiments.

What is claimed is:

1. The method of oxidizing $SO_2$ to $SO_3$ which comprises passing a gaseous reaction mass containing $SO_2$ and $O_2$ in reactive proportions into contact with a potassium oxide, vanadium oxide, silica catalyst in which the catalyst has pores of which a major proportion have a radius about 5000 A., at a temperature of at least about 440° C., passing the gas, when the temperature of the reaction has been reduced to about 400 to 440° C., into contact with a like catalyst having pores the majority of which have a radius of about 1000 A. to 3000 A., and passing the gas, when the temperature of the reaction has been reduced to at most 400° C. into contact with a like catalyst a majority of pores with a radius of about 50 to 500 A., and recovering the converted gas.

2. A method of oxidizing $SO_2$ to $SO_3$ which comprises passing a gaseous reaction mass containing $SO_2$ and $O_2$ in reactive proportions into contact with a potassium oxide, vanadium oxide, silica catalyst at a temperature at least about 400° C., passing the gas, when the temperature of the reaction has been reduced to about 400 to 440° C., into contact with a like catalyst having pores the majority of which have a radius of about 1000 A. to 3000 A., and passing the gas, when the temperature of the reaction has been reduced to at most about 400° C. into contact with a like catalyst having a majority of pores with a radius of about 50 to 500 A. and recovering the converted gas.

3. A method of oxidizing $SO_2$ to $SO_3$ which comprises passing a gaseous reaction mass at temperatures between about 400 and about 550° C. into contact with a porous catalytic reaction mass having vanadium oxide and potassium oxide on a silica base which has pores a major proportion of which are of radius between about 1000 and 5000 A., and thereafter passing the reacting gases into contact with a like catalytic reaction mass having pores of radius between about 50 and 500 A. at a temperature not substantially over 400° C.

4. A method of oxidizing $SO_2$ gas to $SO_3$ on a vanadium oxide, potassium oxide, silica catalyst which comprises conducting the reaction on a said catalyst of pore size between about 50 and 500 A. radius when the temperature of the reaction is in the temperature range not substantially above 400° C.

5. A method of oxidizing $SO_2$ gas to $SO_3$ on a vanadium oxide, potassium oxide, silica catalyst which comprises commencing the reaction on said catalyst having a predominant amount of pores having radii between 3000 to 5000 A. at a temperature above 440° C., continuing the reaction on a similar catalyst having a predominant amount of pores having radii between 1000 to 3000 A., at a temperature between about 400 and 440° C., and substantially completing the reaction on a similar catalyst having a predominant amount of pores having radii between 50 and 500 A. at a temperature below 400° C.

6. The process of claim 5 wherein the predominancy is at least 60% of the pores.

References Cited by the Examiner

UNITED STATES PATENTS 1,828,380  10/1930  Rotger _____ 23—175

OTHER REFERENCES

Duecker, Manufacture of Sulfuric Acid, Reinhold Publishing Corp., New York (1959), p. 204.

G. I. Chufarov et al., "Effect of Porosity of Silica Gel as a Catalyst Carrier on the velocity of Oxidation of Sulfur Dioxide Gas."

G. I. Chufarov et al., The Effect of Porosity of Silica Gels as Catalyst Carriers Upon the Speed of Oxidation of Sulfur Dioxide. J. Phys. Chem. (U.S.S.R.), vol. 5, pp. 936–45 (1934).

J. Phys. Chem. (U.S.S.R.), volume 6, pp. 152–6 (1935).

OSCAR R. VERTIZ, *Primary Examiner.*

MAURICE A. BRINDISI, *Examiner.*

R. M. DAVIDSON, A. J. GREIF, *Assistant Examiners.*